United States Patent
Simon

(10) Patent No.: US 11,524,792 B2
(45) Date of Patent: Dec. 13, 2022

(54) SURFACE TRIM FOR ACOUSTIC ABSORPTION

(71) Applicant: OFFICE NATIONAL D'ETUDES ET DE RECHERCHES AEROSPATIALES, Palaiseau (FR)

(72) Inventor: Frank Simon, Toulouse (FR)

(73) Assignee: OFFICE NATIONAL D'ETUDES ET DE RECHERCHES AEROSPATIALES, Palaiseau (FR)

( * ) Notice: Subject to any disclaimer, the term of this patent is extended or adjusted under 35 U.S.C. 154(b) by 508 days.

(21) Appl. No.: 16/606,859

(22) PCT Filed: Apr. 13, 2018

(86) PCT No.: PCT/FR2018/050945
§ 371 (c)(1),
(2) Date: Oct. 21, 2019

(87) PCT Pub. No.: WO2018/193192
PCT Pub. Date: Oct. 25, 2018

(65) Prior Publication Data
US 2020/0130854 A1    Apr. 30, 2020

(30) Foreign Application Priority Data
Apr. 21, 2017 (FR) ...................... 17 53489

(51) Int. Cl.
*B64D 29/00* (2006.01)
*G10K 11/162* (2006.01)
*G10K 11/172* (2006.01)

(52) U.S. Cl.
CPC ............ *B64D 29/00* (2013.01); *G10K 11/162* (2013.01); *G10K 11/172* (2013.01)

(58) Field of Classification Search
CPC ...... G10K 11/162; G10K 11/172; B64D 29/00
(Continued)

(56) References Cited

U.S. PATENT DOCUMENTS 4,106,587 A * 8/1978 Nash ................. F02K 1/827
                                                   181/290
5,512,715 A * 4/1996 Takewa ............. G10K 11/168
                                                   181/290
(Continued)

FOREIGN PATENT DOCUMENTS

CN          2527764        12/2002
CN        104616647         5/2015
(Continued)

OTHER PUBLICATIONS

International Search Report—PCT/FR2018/050945—dated Aug. 24, 2018.

*Primary Examiner* — Forrest M Phillips
(74) *Attorney, Agent, or Firm* — Nixon & Vanderhye

(57) ABSTRACT

A surface liner member includes an external wall which is provided with multiple holes, a spacer structure, and tubes which are respectively associated with the holes in the external wall. The surface liner member is intended to be applied to a base surface in order to reduce, by acoustic absorption, an acoustic wave reflected on this base surface. The acoustic absorption efficiency is improved, particularly for frequencies below 500 Hz, by varying the shape of the holes in the external wall such that the ratio of the hole perimeter to the hole area varies. Such a surface liner member may be adapted to form a surface portion of an aircraft engine nacelle, or of a leading edge of an aircraft wing.

20 Claims, 5 Drawing Sheets

(58) Field of Classification Search
USPC .......................................................... 181/222
See application file for complete search history.

(56) References Cited

U.S. PATENT DOCUMENTS

| | | | | |
|---|---|---|---|---|
| 7,401,682 | B2* | 7/2008 | Proscia | F02K 1/827 239/265.17 |
| 7,413,053 | B2* | 8/2008 | Wasif | F23M 20/005 181/292 |
| 8,381,872 | B2* | 2/2013 | Alexander | G10K 11/162 52/145 |
| 11,208,193 | B2* | 12/2021 | Ravise | G10K 11/168 |
| 2013/0118831 | A1 | 5/2013 | Kawai et al. | |
| 2013/0341119 | A1* | 12/2013 | Ichihashi | G10K 11/172 181/207 |
| 2014/0027199 | A1* | 1/2014 | Claeys | G10K 11/172 181/290 |

FOREIGN PATENT DOCUMENTS

| | | |
|---|---|---|
| EP | 1 310 658 | 5/2003 |
| JP | 2007-245847 | 9/2007 |
| WO | WO-2021004735 A1 * | 1/2021 |

* cited by examiner

SURFACE TRIM FOR ACOUSTIC ABSORPTION

The present invention relates to a surface liner member, commonly called a "liner", which is intended to be applied to a base surface in order to produce acoustic absorption. It also relates to a method for manufacturing such a surface liner.

BACKGROUND OF THE INVENTION

It is known to apply a liner to a base surface in order to reduce, by acoustic absorption, an acoustic wave reflected on the base surface through the liner. The liner has an external wall which is held at a distance in front of the base surface by a rigid spacer, for example by a honeycomb structure. The acoustic absorption is essentially produced by the external wall, which has holes to allow the acoustic waves to pass through this external wall, between the outside of the liner and the intermediate space between the external wall and the base surface. Such liners are used in particular to form a surface portion of an aircraft engine nacelle, or a portion of a leading edge of an aircraft wing. Typically, the gap between the external wall and the base surface is about a quarter of the acoustic wavelength which corresponds to the maximum absorption efficiency, in order to produce a resonance effect that exacerbates acoustic absorption. However, such liners are not very effective for acoustic frequencies below 500 Hz (hertz).

However, UHBR ("ultra high bypass ratio") type aircraft engines have nacelles that are shorter and thinner, and therefore require liners having an improved acoustic absorption efficiency below 500 Hz.

In another field of application, document CN2527764 proposes increasing the acoustic absorption of a duct wall inside an air blowing apparatus, by providing this wall with holes similarly to the external wall of a liner as described above, and additionally providing a tube from each hole opposite the passage of the blown air. The tubes fill the intermediate space between the wall of the duct for blown air and an external casing of the apparatus. The acoustic absorption is increased due to the length of the acoustic wave propagation path in each tube. However, the resonance effect obtained by a cavity having a depth of about a quarter of the wavelength of the acoustic wave to be absorbed is not implemented.

Lastly, it has also been proposed to combine the resonant cavity effect and the absorption effect which is increased by conduction of acoustic waves inside tubes, in particular in the article by F. Simon entitled "Low frequency sound absorption of resonators with flexible tubes", Proceedings of ICA2013, June 2013, and during the presentation entitled "'Low Frequency' Acoustic Resonators for Aircraft Engine Nacelle Application", CFA 2016, Le Mans. In particular, it has been suggested that the tubes have individual lengths that are smaller than the depth of the resonant cavity. Such a surface liner member comprises:
- the external wall which is provided with multiple holes, each hole individually forming an open passage through this external wall;
- a spacer structure, which is connected to an inner face of the external wall and which is adapted to establish a gap between the latter and a base surface on which the liner is applied, so as to form at least one acoustic cavity between the inner face of the external wall and this base surface; and
- tubes, which are connected to the external wall and which extend into the acoustic cavity from the inner face of the external wall, in the direction of the base surface, each tube being open at two opposite ends of this tube and being dedicated to one of the holes in the external wall with a hole section that is contained in an inner section of the tube at the external wall.

In addition, the length of each tube, measured in a direction perpendicular to the inner face of the external wall, is less than the gap between the external wall and the base surface, such that at least 10% of this gap is devoid of tubes, against the base surface.

SUMMARY OF THE INVENTION

Based on this situation, an object of the present invention is to further increase the acoustic absorption of a surface liner member, particularly for acoustic wave frequencies that are less than 500 Hz.

An additional object of the invention is to propose a manufacturing method for such a surface liner member in which the acoustic absorption is increased.

For this purpose, a first aspect of the invention proposes a surface liner member as mentioned above, but wherein several of the holes in the external wall have different cross-sectional shapes, such that a quotient of the hole cross-sectional perimeter divided by the hole cross-sectional area varies between at least some of the holes.

Indeed, at equal hole cross-sectional areas, a hole through the external wall causes a low-frequency acoustic absorption which is greater when its cross-sectional perimeter is longer. Specifically, a low-frequency main absorption peak is shifted to lower acoustic frequency values as the quotient of the hole cross-sectional perimeter divided by the hole cross-sectional area increases. Using holes that have different values for this quotient makes it possible to broaden an apparent total acoustic absorption peak of the surface liner member, which is effective at a low frequency.

In preferred embodiments of the invention, at least one of the following additional features may advantageously be applied alone or in combination:
- a cross-section of each hole may be identical to the internal cross-section of the tube associated with it, at the inner face of the external wall;
- at least some of the tubes may have respective lengths which are different, each measured in the direction perpendicular to the inner face of the external wall;
- each tube may extend perpendicularly to the inner face of the external wall;
- the length of each tube may be less than the gap between the external wall and the base surface, by a distance of between 2 mm and 40 mm, in the direction perpendicular to the inner face of the external wall;
- for at least one of the tubes, the internal cross-section of this tube may vary as a function of the distance measured from the inner face of the external wall, in the direction perpendicular to this inner face. In particular, it may vary homothetically from a central axis of the tube, with a homothetic ratio which varies as a function of the distance to the external wall. In particular, a gap between the central axis of the tube and an inner surface of the same tube, in a meridional plane of the tube, may vary exponentially as a function of the distance to the inner face of the external wall;

a peripheral edge of at least one of the holes may be a polygon with more than four sides. In particular, this peripheral edge of the hole may have a fractal pattern of second order or above;

the set of holes may occupy a surface area fraction comprised between 2% and 20%, preferably between 4% and 8%, of the inner face of the external wall;

the spacer structure may comprise rigid partitions which extend perpendicularly to the inner face of the external wall. In this case, the distance between two partitions of the spacer structure which are opposite one another is preferably less than half of the smallest acoustic wavelength recommended for the surface liner member; and for each hole, the smallest distance between two edge portions of the hole which are parallel and opposite, is preferably greater than twice the acoustic boundary layer thickness, this being equal to $(\rho \cdot \tau \cdot f/\mu)^{-1/2}$, where $\rho$ is the density of the air at 25° C. (degrees Celsius) and $10^5$ Pa (Pascal), $\mu$ is the viscosity of the air under the same conditions, and f is a recommended acoustic frequency for the surface liner member, comprised between 100 Hz and 500 Hz, for example equal to 200 Hz.

In general, surface liner members according to the invention can have a shape adapted to form a surface portion of an aircraft engine nacelle, a portion of a leading edge of an aircraft wing, a portion of an acoustic absorption device for an air conditioning system, or a portion of a blower inner wall.

Also generally, one end of the spacer structure which is opposite to the external wall may be adapted to be bonded to the base surface.

In addition, a second aspect of the invention provides a method for manufacturing a surface liner member which is in accordance with the first aspect, wherein the tubes, and optionally also the spacer structure, are formed by a method of three-dimensional printing or injection molding from the inner face of the external wall.

BRIEF DESCRIPTION OF THE DRAWINGS

Other features and advantages of the invention will be apparent from the following description of some non-limiting exemplary embodiments, with reference to the appended drawings, in which.

DETAILED DESCRIPTION OF THE PREFERRED EMBODIMENTS

Figure 1:
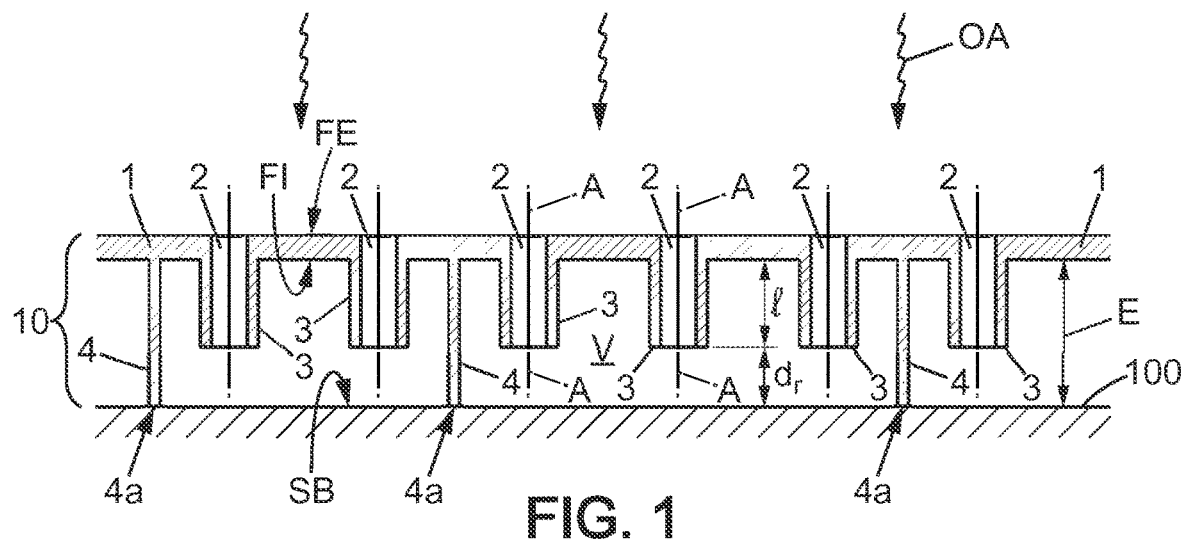
FIG. 1 is a sectional view of a surface liner member according to the invention.
Figure 2A:
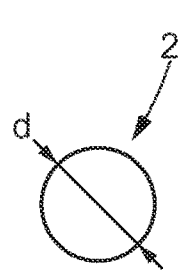
FIGS. 2a to 2g show cross-sectional shapes of holes that can be used in a surface liner member according to the invention.
Figure 2B:
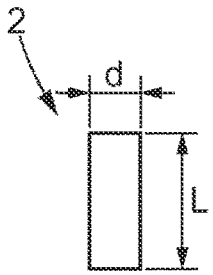
Figure 2C:
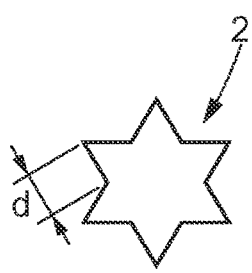
Figure 2D:
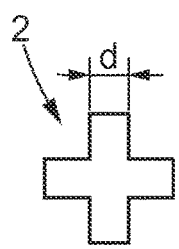
Figure 2E:
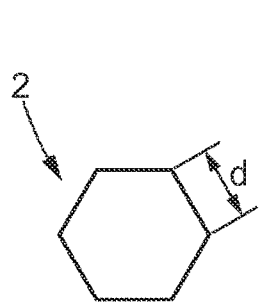
Figure 2F:
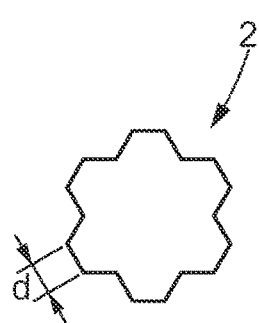
Figure 2G:
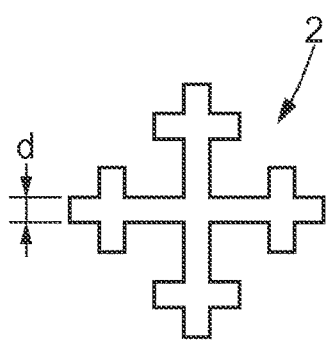

For the sake of clarity, the dimensions of the members represented in these figures do not correspond to actual dimensions or actual dimension ratios. In addition, identical references indicated in different figures denote members which are identical or have identical functions.

In the figures, the indicated references have the following meanings:

100 structural member for receiving the surface liner member

SB surface of the structural member 100, onto which the surface liner member is applied; called the base surface 10 surface liner member 1 external wall of the surface liner member 10

FI inner face of the external wall 1

FE outer face of the external wall 1

2 open holes through the external wall 1

3 tube associated with each hole 2, extending from the inner face FI of the external wall 1

4 partition, extending from the inner face FI of the external wall 1

4a distal end of each partition 4, opposite to the external wall 1

V intermediate volume between the inner face FI of the external wall 1 and the base surface SB of the structural member 100

OA incident acoustic wave on the outer face FE of the external wall 1

A-A central axis of each of the tubes 3

E gap between the inner face FI of the external wall 1 and the base surface SB of the structural member 100 l length of each tube 3, measured along the axis A-A of the tube from the inner face FI of the external wall 1

$d_r$ residual distance between the distal end of each tube 3, opposite to the external wall 1, and the base surface SB of the structural member 100

The structural member 100 may be a portion of an aircraft engine nacelle, for example. However, for clarity in the figures but in a non-limiting manner, the base surface SB of the structural member 100 is shown as being flat.

The surface liner member 10 constitutes a covering of the structural member 100. For this purpose, the surface liner member 10 is fixed on the surface SB of the structural member 100, for example by bonding the distal ends 4a of the partitions 4 to the base surface SB.

The structural member 10 comprises the external wall 1, the tubes 3, and the partitions 4. The tubes 3 and the partitions 4, which are rigid, may be attached to the inner face FI of the external wall 1, or may be of continuous material with the external wall 1, for example by being formed starting from the inner face FI. They may extend perpendicularly to the inner face FI of the external wall 1, but not necessarily. According to a preferred method for manufacturing the structural member 10, at least the tubes 3, but possibly also the partitions 4, may be produced by three-dimensional printing or by using an injection molding process.

The length of the partitions 4 determines the gap E (FIG. 1) when the surface liner member 10 is fixed on the surface SB of the structural member 100. Preferably, the partitions 4 have identical lengths so that the inner face FI and the base surface SB are parallel. Without the tubes 3, the spacing E would be substantially equal to a quarter of the value of the wavelength of the acoustic wave OA for which a maximum acoustic absorption is desired. However, in the presence of the tubes 3, the gap E can be from 1/20 to 1/30 for example of the acoustic wavelength for which the maximum acoustic absorption is desired. The maximum absorption frequency for the acoustic wave OA can therefore be reduced by the presence of the tubes 3 by a factor of 5 to 7 in comparison to a resonator without tubes 3, for a given gap E. In addition, the distance between two partitions 4 which are facing each other is preferably less than half of the smallest acoustic wavelength recommended for the surface liner member 10. In these conditions, the wave travels through the external wall 1 primarily through the holes 2, propagates along the tubes 3, then in the volume V towards the structural member 100, is reflected by the base surface SB, propagates again in the volume V but in the direction of the external wall 1, then again travels through the tubes 3 and the outer wall 1 to the outside. In a known manner, the absorption of the acoustic wave OA essentially occurs at each passage through the tubes 3 and external wall 1.

Each partition 4 may be of any geometry. In particular, each partition 4 may have one or more openings while fulfilling its function of rigid spacer between the external wall 1 and the structural member 100.

Each hole 2 extends from the outer face FE of the external wall 1 to its inner face FI, forming an open passage between the outside and the intermediate volume V. It thus allows a portion of the acoustic wave OA to pass through the external wall 1. The acoustic absorption spectrum that affects the wave OA during such passage is shifted to lower frequency values when the quotient of the perimeter of the hole 2 divided by its cross-sectional area is higher. Tables 1 and 2 below show the quotient values for the hole perimeter divided by its cross-sectional area for different shapes and for two values of hole cross-sectional area:

TABLE 1

| for a cross-sectional area of each hole 2 of about 1.27 mm² | | | | |
|---|---|---|---|---|
| Shape of cross-section | round | slit | Regular six-pointed star with point angles of 60° | Vicsek fractal pattern of first order (cross) |
| Figure | 2a | 2b | 2c | 2d |
| Dimension(s) (mm) | diameter d = 1.27 | width: d = 0.80 length: L = 1.60 | side of arm d = 0.86 | arm thickness d = 0.5 |
| Quotient perimeter/area (mm⁻¹) | ~3.14 | ~4.3 | ~4.7 | ~4.8 |

TABLE 2

| for a cross-sectional area of each hole 2 of about 3.14 mm² | | | | | |
|---|---|---|---|---|---|
| Shape of cross-section | round | Hexagonal | Gosper Island fractal pattern, second order | Regular six-pointed star with point angles of 60° | Vicsek fractal pattern of first order (cross) | Vicsek fractal pattern of second order |
| FIG. | 2a | 2e | 2f | 2c | 2d | 2g |
| Dimension (mm) | diameter d = 2.0 | side d = 1.1 | side of island d = 0.42 | side of arm d = 1.35 | arm thickness d = 0.79 | arm thickness d = 0.355 |
| Quotient Perimeter/area (mm⁻¹) | ~2.0 | ~2.1 | ~2.4 | ~3.0 | ~3.0 | ~5.9 |

In general, the smallest distance between two portions of the edge of a hole that are parallel and opposite, is preferably greater than twice an acoustic boundary layer thickness $\delta_{ac}$, calculated according to the formula: $\delta_{ac}=(\rho\cdot\tau\cdot f/\mu)^{-1/2}$, where $\rho$ is the density of the air at 25° C. (degrees Celsius) and $10^5$ Pa (Pascal), $\mu$ is the viscosity of the air under the same conditions, and f is the frequency of the acoustic wave OA, preferably comprised between 100 Hz and 500 Hz, for example equal to 200 Hz. This condition ensures that a significant portion of the acoustic wave OA enters the intermediate volume V through the hole 2.

Each hole 2 is provided with a tube 3 which extends from the inner face FI of the external wall 1 in the direction of the structural member 100. In the embodiments described, but without this being essential for the invention, each tube 3 has a central longitudinal axis A-A which is straight and perpendicular to the inner face FI at the location of the hole. In addition, the internal cross-section of each tube 3 at the inner face FI is identical and coincident with the cross-section of the corresponding hole 2. Furthermore, each tube 3 has a length l which is less than 90% of the gap E between the inner face FI of the external wall 1 and the base surface SB of the structural member 100.

Under these conditions, the diagrams of FIGS. 3a, 3b, 3c, and 3d each show the effect of the shape of the holes 2 on the absorption spectrum of the acoustic wave OA. The horizontal axis of each diagram indicates the frequency f of the acoustic wave OA, expressed in hertz (Hz), and the vertical axis indicates the spectral absorption denoted Abs (f), normalized with respect to its maximum value of 1.

Figure 3A:
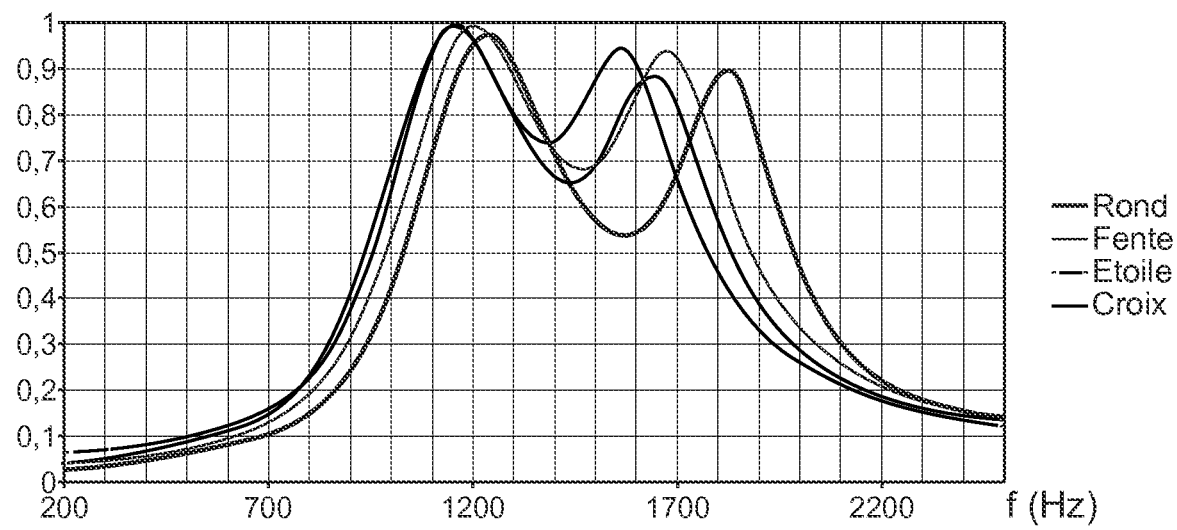
FIGS. 3a, 3b, 3c, and 3d are diagrams of acoustic absorption as a function of acoustic wave frequency.
Figure 3B:
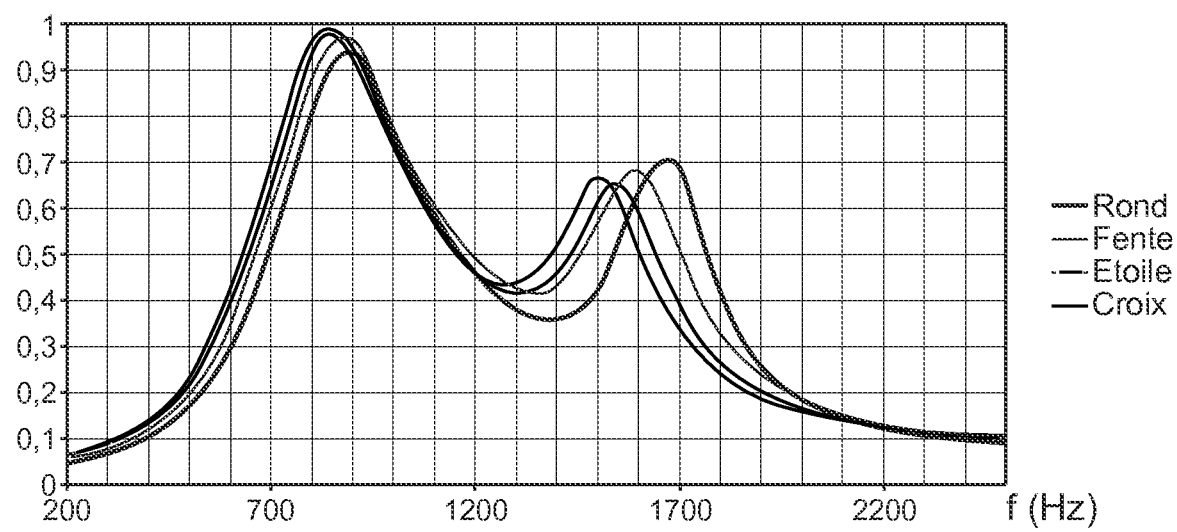
Figure 3C:
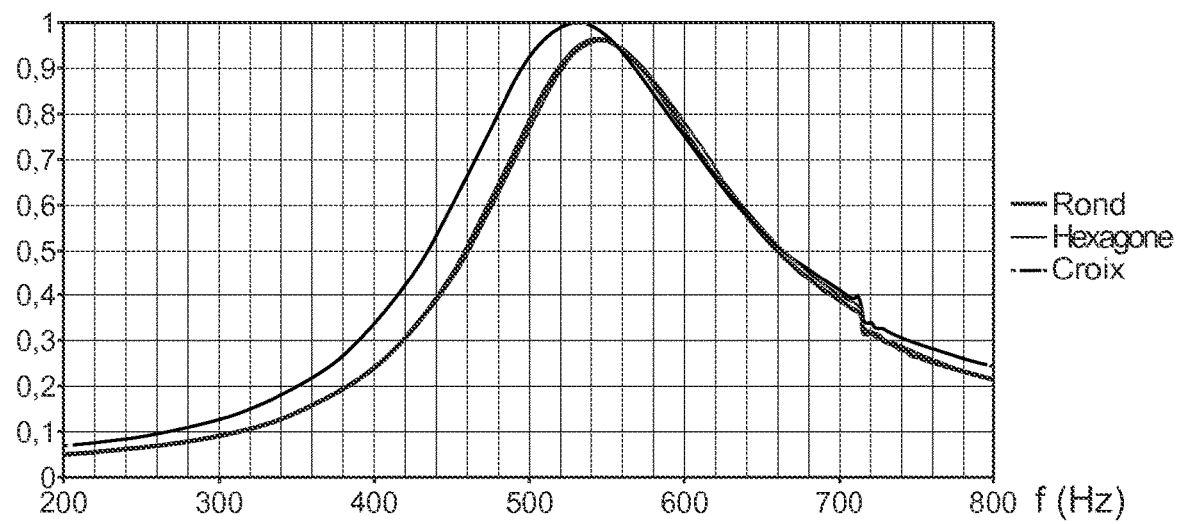
Figure 3D:
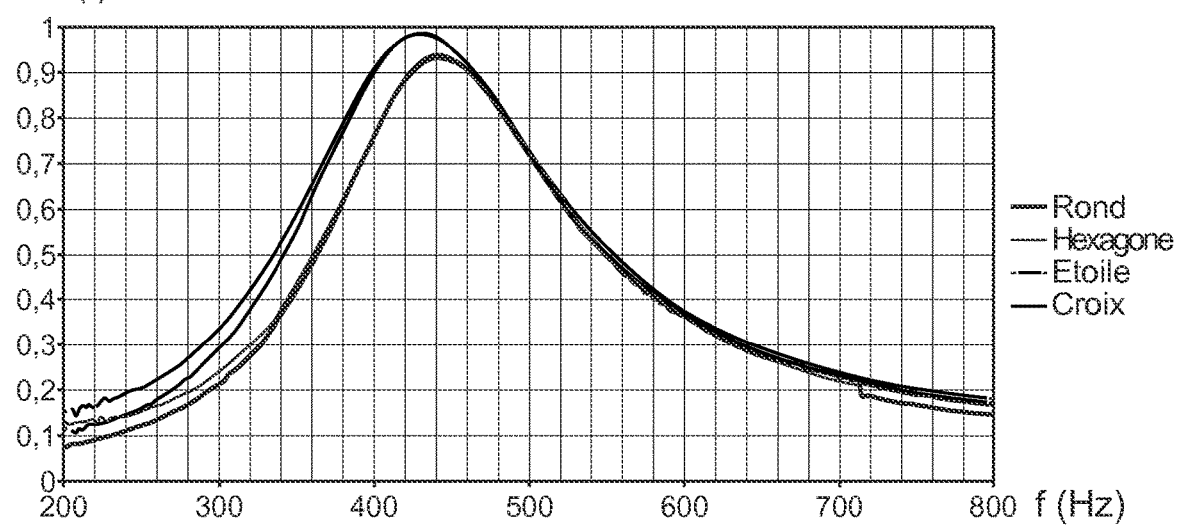

The diagram of FIG. 3a corresponds to the value of 10 mm (millimeters) for the gap E between the inner face FI of the external wall 1 and the base surface SB of the structural member 100. The diagram of FIG. 3b corresponds to the value of 20 mm for this gap E. All the tubes 3 have a length l which is equal to 5 mm (millimeters) and an internal cross-sectional area which is about 1.27 mm² for the two diagrams of FIGS. 3a and 3b. For each curve in these diagrams, all the holes 2 are identical, of the shape indicated in the inset legend of the corresponding diagram and with the hole dimension(s) indicated in Table 1 above for that shape of hole. A comparison of these two diagrams shows that the main absorption peak at low frequency shifts towards the lower values of the frequency f when the gap E increases, and that at constant value of the gap E, this peak is also shifted towards the lower values of the frequency f when the quotient of the hole perimeter divided by the hole cross-sectional area increases. In addition, FIG. 3b shows a broadening of approximately 7% of the lower main absorption frequency band as the quotient of the perimeter divided by the hole cross-sectional area increases.

To move the absorption peak to around or below 500 Hz, the length l of the tubes 3 can be set at 15 mm for a gap E of 20 mm (FIG. 3c) or 30 mm (FIG. 3d) between the inner face FI of the external wall 1 and the base surface SB of the structural member 100. All the holes 2 related to each of the curves of FIG. 3c or 3d still have the same shape, which is indicated in the inset legend of the corresponding diagram, with a hole cross-sectional area of about 3.14 mm$^2$ (see Table 2 above for the dimensions of the holes that correspond to the curves of FIGS. 3c and 3d). The same behaviors are then observed as when the length l of the tubes 3 is equal to 5 mm and the hole cross-sectional area is about 1.27 mm$^2$ (FIGS. 3a and 3b), in other words a maximum absorption that is governed by the quotient of the hole perimeter divided by the hole cross-sectional area.

Figure 4A:
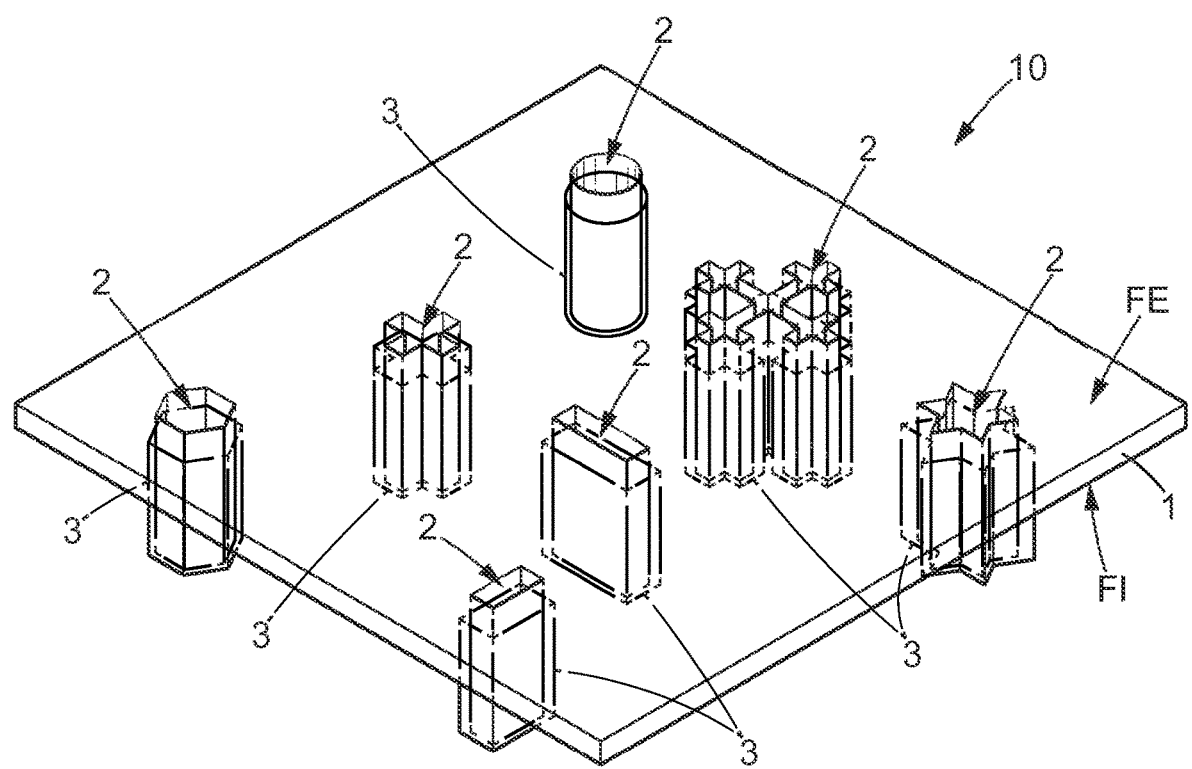
FIGS. 4a and 4b are perspective views, in two opposite directions, of a surface liner member according to the invention.
Figure 4B:
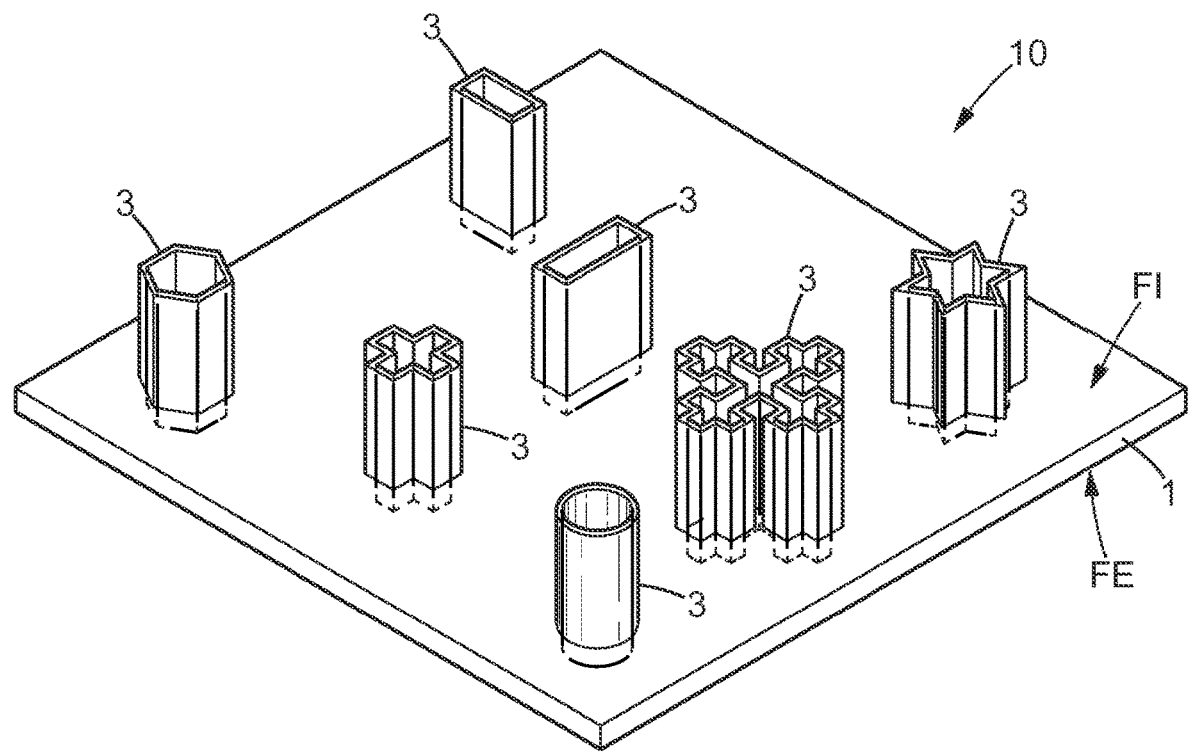

A surface liner member 10 according to the invention is illustrated in FIGS. 4a and 4b. For clarity in FIGS. 4a and 4b, the partitions 4 have not been represented in these two figures but are present in the actual surface liner member. In this liner member 10, the shape varies between several of the holes 2, such that the value of the quotient of the cross-sectional perimeter of a hole divided by its cross-sectional area varies within the same liner member. Thus, the same surface liner member 10 simultaneously has holes 2 of at least two different patterns among a round, cross-shaped, slit-shaped, hexagonal, or six-pointed star pattern, or fractals of various patterns, etc., and whose orientations in the outer face FE may also vary. The absorption spectrum of such a surface liner member 10 is therefore a combination of the spectra that correspond to each of the hole cross-sectional shapes. As a consequence, the resulting absorption spectrum exhibits a main absorption peak which is broadened at low acoustic frequency, with a constant value for the gap E. This broadened peak produces sound absorption values which are greater when the acoustic frequency f is less than 500 Hz. The gain in absorption efficiency that is achieved in this manner at 500 Hz can be 7% or more.

The tube 3 which is associated with each hole 2 may have an internal cross-sectional shape which is identical to the cross-section of the corresponding hole 2. In the embodiment of the invention which is illustrated in FIGS. 4a and 4b, the internal cross-section of each tube 3 does not vary along each tube, and all the tubes 3 have the same length.

Figure 5A:
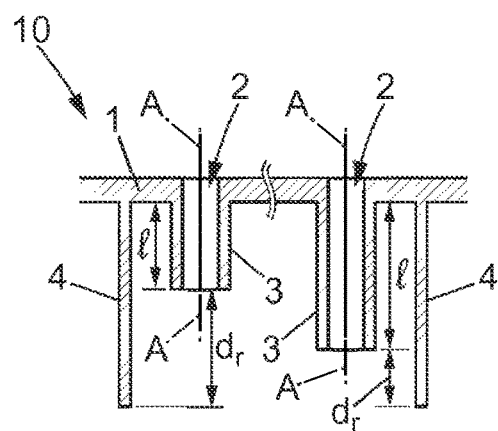
FIGS. 5a and 5b are cross-sectional views of tubes which can be used in various embodiments of the invention, having varying tube lengths, or cross-sectional sizes which vary along each tube.

FIG. 5a illustrates first variants of the invention, in which some of the tubes 3 of the liner member 10 of FIGS. 4a and 4b may have lengths that vary from tube to tube. The residual open distance, denoted $d_r$, which exists between the distal end of one of the tubes 3, opposite to the external wall 1, and the structural member 100, is equal to E-l. For surface liner members in accordance with the invention, this residual open distance $d_r$ is greater than 10% of the gap E. This condition is maintained when all the tubes 3 have identical lengths. In general, it guarantees an optimum combination between the resonance effect produced by the gap E and the increased sound absorption produced by the various shapes of the holes 2. Preferably, the residual free distance $d_r$ can be greater than 2 mm for all tubes 3 of the surface liner member 10.

Figure 5B:
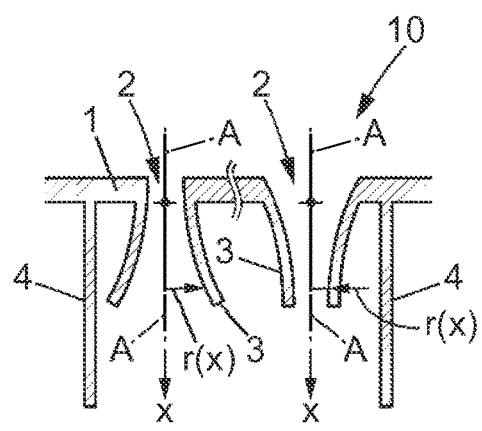

FIG. 5b illustrates second variants of the invention, in which some of the tubes 3 of the liner member 10 may have internal cross-sections that vary as a function of the distance x from the inner face FI of the external wall 1. For example, the internal cross-section of a tube 3 may vary between two planes which are perpendicular to the axis A-A of this tube and which correspond to different values for the distance x, homothetically, with a ratio of homothety which depends on the distance x. For x=0, the internal cross-section of the tube may be identical to that of the corresponding hole 2. Then, the distance r between the inner surface of a tube 3 and the central axis A-A of that tube can vary according to the distance x in a manner which is identical in all meridional planes which contain the axis A-A. r(x) is thus the ratio of homothety introduced above. In different embodiments of the invention, r(x) can be an affine, increasing, or decreasing function segment, or an exponential function segment which may be increasing or decreasing, or a parabolic segment, a hyperbolic segment, etc. It is possible for r(x) to be a linear combination of several of these functions and, in general, r(x) may be any function as long as the distal end of the tube 3 is open. Thus, each tube 3 of variable cross-section along its central axis A-A may constitute a horn that is conical, exponential, parabolic, hyperbolic, etc., which links the intermediate space V to the open passage formed by the corresponding hole 2 through the external wall 1. In a known manner, such a horn which widens with distance from the inner face FI of the external wall 1 encourages the transfer of acoustic energy through the hole 2. In addition, such a horn has a cut-off frequency $F_c$, below which the acoustic wave OA is no longer transmitted through the horn (corresponding to f<$F_c$). This cutoff frequency is $F_c = C/(4\tau \cdot \alpha)$, where $\alpha$ is a characteristic length of variation of the function r(x).

The features of the first and second variants of the invention, illustrated by FIGS. 5a and 5b, may also be combined in improved embodiments.

The number of holes 2 per unit surface area of the external wall 1 may be comprised between 1 hole/cm$^2$ (hole per square centimeter) and 8 holes/cm$^2$. Given the cross-sectional area of each hole, which may be comprised between 1 mm$^2$ and 4 mm$^2$ for example, all the holes may occupy a surface area fraction of the external wall 1 of 4% to 8% for example.

Finally, the partitions 4 may form a set of separate cells which are next to one another on the inner face FI of the external wall 1. A single hole 2, with its associated tube 3, may be contained in each cell, but it is also possible to have several holes 2, with the tubes 3 associated with them, inside a single cell.

It is understood that the invention may be reproduced while modifying secondary aspects thereof relative to the examples detailed above. In particular, the partitions 4 may be replaced by a spacer structure which has a different geometry, and any distribution with respect to the holes 2. In addition, the numerical values which have been mentioned were provided as examples only.

The invention claimed is:

1. A surface liner member to be applied to a base surface to reduce, by acoustic absorption, an acoustic wave reflected on the base surface through the surface liner member, said surface liner member comprising:
    an external wall provided with multiple holes, each hole of the multiple holes individually forming an open passage through said external wall;
    a spacer structure connected to an inner face of the external wall and adapted to set a gap between said external wall and the base surface so as to form at least one acoustic cavity between the inner face of the external wall and the base surface; and
    tubes connected to the external wall, and which extend into the acoustic cavity from the inner face of said external wall towards the base surface, two opposite ends of each tube of said tubes being open and being dedicated to one of the holes in the external wall with a hole section that is contained in an inner section of the tube at the external wall, wherein a length of each tube is smaller than the gap between the external wall and the base surface, said tube length being measured in a direction perpendicular to the inner face of said external wall, so that at least 10% of the gap between the external wall and the base surface, against said base surface, is devoid of tubes, and wherein a subset of the holes in the external wall have different cross-sectional shapes, such that a quotient of a hole cross-sectional perimeter divided by a hole cross-sectional area varies between at least some of said holes so that an apparent total acoustic absorption peak of the surface liner member is broadened for acoustic wave frequencies that are less than 500 Hz.

2. The surface liner member according to claim 1, wherein at least some of the tubes have respective lengths which are different, each measured in the direction perpendicular to the inner face of the external wall.

3. The surface liner member according to claim 1, wherein each tube extends perpendicularly to the inner face of the external wall.

4. The surface liner member according to claim 1, wherein the length of each tube is less than the gap between the external wall and the base surface, by a distance of between 2 mm and 40 mm, in the direction perpendicular to the inner face of said external wall.

5. The surface liner member according to claim 1, wherein the internal cross-section of at least one of the tubes varies as a function of the distance measured from the inner face of the external wall along the direction perpendicular to said inner face of the external wall.

6. The surface liner member according to claim 1, wherein a peripheral edge of at least one of the holes is a polygon with more than four sides.

7. The surface liner member according to claim 6, wherein the peripheral edge of at least one of the holes has a fractal pattern of second order or higher than second order.

8. The surface liner member according to claim 1, having a shape adapted to form a surface portion of one of an aircraft engine nacelle, a portion of a leading edge of an aircraft wing, a portion of an acoustic absorption device for an air conditioning system, and a portion of a blower inner wall.

9. The surface liner member according to claim 1, wherein one end of the spacer structure which is opposite to the external wall is adapted to be bonded to the base surface.

10. A method for manufacturing a surface liner member which is in accordance with claim 1, wherein the tubes are formed by a method of three-dimensional printing or injection molding from the inner face of the external wall.

11. The surface liner member according to claim 2, wherein each tube extends perpendicularly to the inner face of the external wall.

12. The surface liner member according to claim 2, wherein the length of each tube is less than the gap between the external wall and the base surface, by a distance of between 2 mm and 40 mm, in the direction perpendicular to the inner face of said external wall.

13. The surface liner member according to claim 3, wherein the length of each tube is less than the gap between the external wall and the base surface, by a distance of between 2 mm and 40 mm, in the direction perpendicular to the inner face of said external wall.

14. The surface liner member according to claim 2, wherein the internal cross-section of at least one of the tubes varies as a function of the distance measured from the inner face of the external wall along the direction perpendicular to said inner face of the external wall.

15. The surface liner member according to claim 3, wherein the internal cross-section of at least one of the tubes varies as a function of the distance measured from the inner face of the external wall along the direction perpendicular to said inner face of the external wall.

16. The surface liner member according to claim 4, wherein the internal cross-section of at least one of the tubes varies as a function of the distance measured from the inner face of the external wall along the direction perpendicular to said inner face of the external wall.

17. The surface liner member according to claim 2, wherein a peripheral edge of at least one of the holes is a polygon with more than four sides.

18. The surface liner member according to claim 3, wherein a peripheral edge of at least one of the holes is a polygon with more than four sides.

19. The surface liner member according to claim 4, wherein a peripheral edge of at least one of the holes is a polygon with more than four sides.

20. The surface liner member according to claim 5, wherein a peripheral edge of at least one of the holes is a polygon with more than four sides.

* * * * *